(12) United States Patent
Shrivastava et al.

(10) Patent No.: US 10,614,194 B2
(45) Date of Patent: *Apr. 7, 2020

(54) SYSTEM AND METHOD FOR ARRANGING EQUIPMENT IN A DATA CENTER

(71) Applicant: SCHNEIDER ELECTRIC IT CORPORATION, West Kingston, RI (US)

(72) Inventors: Saurabh Kumar Shrivastava, Lowell, MA (US); James William VanGilder, Pepperell, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 88 days.

This patent is subject to a terminal disclaimer.

(21) Appl. No.: 15/972,496

(22) Filed: May 7, 2018

(65) Prior Publication Data

US 2018/0253518 A1    Sep. 6, 2018

Related U.S. Application Data

(63) Continuation of application No. 13/544,343, filed on Jul. 9, 2012, now Pat. No. 9,996,659, which is a
(Continued)

(51) Int. Cl.
*G06F 17/50*    (2006.01)
*H05K 7/20*     (2006.01)

(52) U.S. Cl.
CPC ....... *G06F 17/509* (2013.01); *H05K 7/20836* (2013.01); *G06F 2217/16* (2013.01)

(58) Field of Classification Search
CPC .............. G06F 17/509; G06F 2217/16; H05K 7/20836
See application file for complete search history.

(56) References Cited

U.S. PATENT DOCUMENTS 3,317,798 A    5/1967  Mu et al.
3,559,728 A    2/1971  Lyman et al.
(Continued)

FOREIGN PATENT DOCUMENTS

CN      2612211 Y      4/2004
DE   102006041788 A1   3/2008
(Continued)

OTHER PUBLICATIONS

Steinbrecher, Robin et al., "Use of Flow Network Modeling (FNM) for the Design of Air-Cooled Servers", Dec. 31, 1999 (Dec. 31, 1999), XP055589843 , Retrieved from the Internet URL:http://citeseerx.ist.psu.edu/viewdoc/dawnload?doi=10.1.1.200.457&rep=rep1&type=pdf [retrieved on May 17, 2019].
(Continued)

*Primary Examiner* — Kamini S Shah
*Assistant Examiner* — Russ Guill
(74) *Attorney, Agent, or Firm* — Lando & Anastasi, LLP (57) ABSTRACT

A system and method for providing a layout of equipment in a data center, the equipment including a plurality of equipment racks, and at least one rack-based cooling provider. In one aspect, the method includes receiving data regarding airflow consumption for each of the plurality of equipment racks and cooling capacity of the at least one cooling provider, determining a layout of the data center, and displaying the layout of the data center. In the method determining a layout can include pairing each equipment rack of the plurality of equipment racks with another equipment rack of the plurality of equipment racks based on airflow consumption of each of the plurality of equipment racks to create a plurality of pairs of equipment racks, and arranging the plurality of pairs of equipment racks to form a two-row cluster of equipment racks based on the airflow consumption of each equipment rack, wherein each pair includes an
(Continued)

equipment rack in a first row of the cluster and an equipment rack in a second row of the cluster.

20 Claims, 5 Drawing Sheets

Related U.S. Application Data continuation of application No. 12/437,734, filed on May 8, 2009, now Pat. No. 8,219,362.

(56) References Cited

U.S. PATENT DOCUMENTS

| | | |
|---|---|---|
| 3,643,007 A | 2/1972 | Roberts et al. |
| 3,681,936 A | 8/1972 | Park |
| 3,742,725 A | 7/1973 | Berger |
| 3,995,446 A | 12/1976 | Eubank |
| 4,055,053 A | 10/1977 | Elfving et al. |
| 4,127,008 A | 11/1978 | Tyree, Jr. |
| 4,197,716 A | 4/1980 | Nussbaum |
| 4,223,535 A | 9/1980 | Kumm |
| 4,275,570 A | 6/1981 | Szymaszek et al. |
| 4,285,205 A | 8/1981 | Martin et al. |
| 4,419,865 A | 12/1983 | Szymaszek |
| 4,515,746 A | 5/1985 | Brun et al. |
| 4,599,873 A | 7/1986 | Hyde |
| 4,696,168 A | 9/1987 | Woods et al. |
| 4,774,631 A | 9/1988 | Okuyama et al. |
| 4,823,290 A | 4/1989 | Fasack et al. |
| 4,827,733 A | 5/1989 | Dinh |
| 4,837,663 A | 6/1989 | Zushi et al. |
| 4,840,811 A | 6/1989 | Bayerlein et al. |
| 4,911,231 A | 3/1990 | Horne et al. |
| 4,944,158 A | 7/1990 | Akiike et al. |
| 4,962,734 A | 10/1990 | Jorgensen |
| 5,057,968 A | 10/1991 | Morrison |
| 5,095,712 A | 3/1992 | Narreau |
| 5,150,580 A | 9/1992 | Hyde |
| 5,158,132 A | 10/1992 | Guillemot |
| 5,168,724 A | 12/1992 | Gilbertson et al. |
| 5,173,819 A | 12/1992 | Takahashi et al. |
| 5,177,666 A | 1/1993 | Bland et al. |
| 5,181,653 A | 1/1993 | Foster et al. |
| 5,234,185 A | 8/1993 | Hoffman et al. |
| 5,269,372 A | 12/1993 | Chu et al. |
| 5,388,422 A | 2/1995 | Hayashida et al. |
| 5,410,448 A | 4/1995 | Barker, III et al. |
| 5,462,225 A | 10/1995 | Massara et al. |
| 5,507,529 A | 4/1996 | Martins |
| 5,533,357 A | 7/1996 | Voorhis |
| 5,581,478 A | 12/1996 | Cruse et al. |
| 5,582,020 A | 12/1996 | Scaringe et al. |
| 5,649,428 A | 7/1997 | Calton et al. |
| 5,657,641 A | 8/1997 | Cunningham et al. |
| 5,682,949 A | 11/1997 | Ratcliffe et al. |
| 5,694,780 A | 12/1997 | Alsenz |
| 5,704,219 A | 1/1998 | Suzuki et al. |
| 5,718,628 A | 2/1998 | Nakazato et al. |
| 5,735,134 A | 4/1998 | Liu et al. |
| 5,749,237 A | 5/1998 | Sandofsky et al. |
| 5,794,897 A | 8/1998 | Jobin et al. |
| 5,802,856 A | 9/1998 | Schaper et al. |
| 5,850,539 A | 12/1998 | Cook et al. |
| 5,860,280 A | 1/1999 | Recine, Sr. et al. |
| 5,896,922 A | 4/1999 | Chrysler et al. |
| 5,953,930 A | 9/1999 | Chu et al. |
| 5,954,127 A | 9/1999 | Chrysler et al. |
| 5,959,240 A | 9/1999 | Yoshida et al. |
| 5,963,425 A | 10/1999 | Chrysler et al. |
| 5,970,731 A | 10/1999 | Hare et al. |
| 5,970,734 A | 10/1999 | Stillwell et al. |
| 5,972,196 A | 10/1999 | Murphy et al. |
| 5,995,729 A | 11/1999 | Hirosawa et al. |
| 3,023,935 A | 2/2000 | Okazaki et al. |
| 6,032,472 A | 3/2000 | Heinrichs et al. |
| 6,034,872 A | 3/2000 | Chrysler et al. |
| 6,038,879 A | 3/2000 | Turcotte et al. |
| 6,088,225 A | 7/2000 | Parry et al. |
| 6,111,036 A | 8/2000 | Wonders et al. |
| 6,134,511 A | 10/2000 | Subbarao |
| 6,208,510 B1 | 3/2001 | Trudeau et al. |
| 6,209,330 B1 | 4/2001 | Timmerman et al. |
| 6,213,194 B1 | 4/2001 | Chrysler et al. |
| 6,216,482 B1 | 4/2001 | Xiao et al. |
| 6,216,956 B1 | 4/2001 | Ehlers et al. |
| 6,223,810 B1 | 5/2001 | Chu et al. |
| 6,237,353 B1 | 5/2001 | Sishtla et al. |
| 6,246,969 B1 | 6/2001 | Sinclair et al. |
| 6,276,161 B1 | 8/2001 | Peiffer et al. |
| 6,305,180 B1 | 10/2001 | Miller et al. |
| 6,332,335 B1 | 12/2001 | Kajimoto et al. |
| 6,347,627 B1 | 2/2002 | Frankie et al. |
| 6,374,627 B1 | 4/2002 | Schumacher et al. |
| 6,415,628 B1 | 7/2002 | Ahmed et al. |
| 6,438,978 B1 | 8/2002 | Bessler |
| 6,459,579 B1 | 10/2002 | Farmer et al. |
| 6,474,087 B1 | 11/2002 | Lifson |
| 6,494,050 B2 | 12/2002 | Spinazzola et al. |
| 6,557,624 B1 | 5/2003 | Stahl et al. |
| 6,574,104 B2 | 6/2003 | Patel et al. |
| 6,575,234 B2 | 6/2003 | Nelson |
| 6,640,889 B1 | 11/2003 | Harte et al. |
| 6,662,576 B1 | 12/2003 | Bai |
| 6,668,565 B1 | 12/2003 | Johnson et al. |
| 6,672,955 B2 | 1/2004 | Charron |
| 6,682,100 B2 | 1/2004 | Wood et al. |
| 6,694,759 B1 | 2/2004 | Bash et al. |
| 6,695,577 B1 | 2/2004 | Susek |
| 6,714,977 B1 | 3/2004 | Fowler et al. |
| 6,718,277 B2 | 4/2004 | Sharma |
| 6,718,781 B2 | 4/2004 | Freund et al. |
| 6,721,672 B2 | 4/2004 | Spitaels et al. |
| 6,745,579 B2 | 6/2004 | Spinazzola et al. |
| 6,745,590 B1 | 6/2004 | Johnson et al. |
| 6,761,212 B2 | 7/2004 | DiPaolo |
| 6,775,137 B2 | 8/2004 | Chu et al. |
| 6,804,616 B2 | 10/2004 | Bodas |
| 6,804,975 B2 | 10/2004 | Park |
| 6,814,134 B1 | 11/2004 | Pravda |
| 6,819,563 B1 | 11/2004 | Chu et al. |
| 6,827,142 B2 | 12/2004 | Winkler et al. |
| 6,848,989 B2 | 2/2005 | Miyazaki et al. |
| 6,859,366 B2 | 2/2005 | Fink |
| 6,862,179 B2 | 3/2005 | Beitelmal et al. |
| 6,880,349 B2 | 4/2005 | Johnson et al. |
| 6,886,353 B2 | 5/2005 | Patel et al. |
| 6,901,767 B2 | 6/2005 | Wood |
| 6,924,981 B2 | 8/2005 | Chu et al. |
| 6,927,980 B2 | 8/2005 | Fukuda et al. |
| 6,955,058 B2 | 10/2005 | Taras et al. |
| 6,959,558 B2 | 11/2005 | Bean, Jr. et al. |
| 6,967,283 B2 | 11/2005 | Rasmussen et al. |
| 6,967,841 B1 | 11/2005 | Chu et al. |
| 6,973,797 B2 | 12/2005 | Nemit, Jr. |
| 6,973,801 B1 | 12/2005 | Campbell et al. |
| 7,000,416 B2 | 2/2006 | Hirooka et al. |
| 7,000,467 B2 | 2/2006 | Chu et al. |
| 7,012,807 B2 | 3/2006 | Chu et al. |
| 7,020,586 B2 | 3/2006 | Snevely |
| 7,031,870 B2 | 4/2006 | Sharma et al. |
| 7,033,267 B2 | 4/2006 | Rasmussen |
| 7,046,514 B2 | 5/2006 | Fink et al. |
| 7,051,802 B2 | 5/2006 | Baer |
| 7,051,946 B2 | 5/2006 | Bash et al. |
| 7,085,133 B2 | 8/2006 | Hall |
| 7,104,081 B2 | 9/2006 | Chu et al. |
| 7,106,590 B2 | 9/2006 | Chu et al. |
| 7,120,021 B2 | 10/2006 | Hamman |
| 7,140,193 B2 | 11/2006 | Johnson et al. |
| 7,145,772 B2 | 12/2006 | Fink |
| 7,155,318 B2 | 12/2006 | Sharma et al. |
| 7,165,412 B1 | 1/2007 | Bean, Jr. |
| 7,173,820 B2 | 2/2007 | Fink et al. |
| 7,184,269 B2 | 2/2007 | Campbell et al. |

(56) References Cited

U.S. PATENT DOCUMENTS

| | | |
|---|---|---|
| 7,187,549 B2 | 3/2007 | Teneketges et al. |
| 7,197,433 B2 | 3/2007 | Patel et al. |
| 7,228,707 B2 | 6/2007 | Lifson et al. |
| 7,236,363 B2 | 6/2007 | Belady |
| 7,251,547 B2 | 7/2007 | Bash et al. |
| 7,254,307 B2 | 8/2007 | Xin |
| 7,259,963 B2 | 8/2007 | Germagian et al. |
| 7,270,174 B2 | 9/2007 | Chu et al. |
| 7,272,005 B2 | 9/2007 | Campbell et al. |
| 7,274,566 B2 | 9/2007 | Campbell et al. |
| 7,284,379 B2 | 10/2007 | Pham et al. |
| 7,298,617 B2 | 11/2007 | Campbell et al. |
| 7,298,618 B2 | 11/2007 | Campbell et al. |
| 7,313,503 B2 | 12/2007 | Nakagawa et al. |
| 7,315,448 B1 | 1/2008 | Bash et al. |
| 7,363,516 B2 | 4/2008 | Bresniker et al. |
| 7,365,973 B2 | 4/2008 | Rasmussen et al. |
| 7,366,632 B2 | 4/2008 | Hamann et al. |
| 7,403,391 B2 | 7/2008 | Germagian et al. |
| 7,406,839 B2 | 8/2008 | Bean et al. |
| 7,418,825 B1 | 9/2008 | Bean, Jr. |
| 7,426,453 B2 | 9/2008 | Patel et al. |
| 7,472,043 B1 | 12/2008 | Low et al. |
| 7,558,649 B1 | 7/2009 | Sharma et al. |
| 7,568,360 B1 | 8/2009 | Bash et al. |
| 7,596,476 B2 | 9/2009 | Rasmussen et al. |
| 7,620,480 B2 | 11/2009 | Patel et al. |
| 7,676,280 B1 | 3/2010 | Bash et al. |
| 7,681,404 B2 | 3/2010 | Bean, Jr. |
| 7,726,144 B2 | 6/2010 | Larson et al. |
| 7,775,055 B2 | 8/2010 | Bean et al. |
| 7,844,440 B2 | 11/2010 | Nasle et al. |
| 7,881,910 B2 | 2/2011 | Rasmussen et al. |
| 7,885,795 B2 | 2/2011 | Rasmussen et al. |
| 7,975,156 B2 | 7/2011 | Artman et al. |
| 7,979,250 B2 | 7/2011 | Archibald et al. |
| 7,991,592 B2 | 8/2011 | VanGilder et al. |
| 8,155,922 B2 | 4/2012 | Loucks |
| 8,219,362 B2 | 7/2012 | Shrivastava et al. |
| 8,229,713 B2 | 7/2012 | Hamann et al. |
| 8,244,502 B2 | 8/2012 | Hamann et al. |
| 8,249,825 B2 | 8/2012 | VanGilder et al. |
| 8,315,841 B2 | 11/2012 | Rasmussen et al. |
| 8,425,287 B2 | 4/2013 | Wexler |
| 8,473,265 B2 | 6/2013 | Hlasny et al. |
| 8,509,959 B2 | 8/2013 | Zhang et al. |
| 2001/0042616 A1 | 11/2001 | Baer |
| 2002/0059804 A1 | 5/2002 | Spinazzola et al. |
| 2002/0072868 A1 | 6/2002 | Bartone et al. |
| 2002/0074096 A1 | 6/2002 | Wierer et al. |
| 2002/0134096 A1 | 9/2002 | Shim et al. |
| 2002/0149911 A1 | 10/2002 | Bishop et al. |
| 2003/0019221 A1 | 1/2003 | Rossi et al. |
| 2003/0042004 A1 | 3/2003 | Novotny et al. |
| 2003/0115000 A1 | 6/2003 | Bodas |
| 2003/0115024 A1 | 6/2003 | Snevely |
| 2003/0130912 A1 | 7/2003 | Davis et al. |
| 2003/0147216 A1 | 8/2003 | Patel et al. |
| 2003/0149685 A1 | 8/2003 | Trossman et al. |
| 2003/0158718 A1 | 8/2003 | Nakagawa et al. |
| 2003/0184975 A1 | 10/2003 | Steinman et al. |
| 2004/0016243 A1 | 1/2004 | Song et al. |
| 2004/0020224 A1 | 2/2004 | Bash et al. |
| 2004/0031282 A1 | 2/2004 | Kopko |
| 2004/0065097 A1 | 4/2004 | Bash et al. |
| 2004/0065100 A1 | 4/2004 | Jacobsen |
| 2004/0065104 A1 | 4/2004 | Bash et al. |
| 2004/0075984 A1 | 4/2004 | Bash et al. |
| 2004/0083012 A1 | 4/2004 | Miller |
| 2004/0089009 A1 | 5/2004 | Bash et al. |
| 2004/0089011 A1 | 5/2004 | Patel et al. |
| 2004/0098991 A1 | 5/2004 | Heyes |
| 2004/0099747 A1 | 5/2004 | Johnson et al. |
| 2004/0100770 A1 | 5/2004 | Chu et al. |
| 2004/0120855 A1 | 6/2004 | Reichel et al. |
| 2004/0163001 A1 | 8/2004 | Bodas |
| 2004/0190247 A1 | 9/2004 | Chu et al. |
| 2004/0240514 A1 | 12/2004 | Bash et al. |
| 2004/0262409 A1 | 12/2004 | Crippen et al. |
| 2005/0016189 A1 | 1/2005 | Wacker |
| 2005/0023363 A1 | 2/2005 | Sharma et al. |
| 2005/0044882 A1 | 3/2005 | Hong et al. |
| 2005/0061013 A1 | 3/2005 | Bond |
| 2005/0132729 A1 | 6/2005 | Manole |
| 2005/0170770 A1 | 8/2005 | Johnson et al. |
| 2005/0213306 A1 | 9/2005 | Vos et al. |
| 2005/0225936 A1 | 10/2005 | Day |
| 2005/0228618 A1 | 10/2005 | Patel et al. |
| 2005/0237715 A1 | 10/2005 | Staben et al. |
| 2005/0237716 A1 | 10/2005 | Chu et al. |
| 2005/0248922 A1 | 11/2005 | Chu et al. |
| 2005/0267639 A1 | 12/2005 | Sharma et al. |
| 2005/0284169 A1 | 12/2005 | Tamura et al. |
| 2006/0002086 A1 | 1/2006 | Teneketges et al. |
| 2006/0042289 A1 | 3/2006 | Campbell et al. |
| 2006/0080001 A1 | 4/2006 | Bash et al. |
| 2006/0081545 A1 | 4/2006 | Rassmussen et al. |
| 2006/0096306 A1 | 5/2006 | Okaza et al. |
| 2006/0102575 A1 | 5/2006 | Mattlin et al. |
| 2006/0112286 A1 | 5/2006 | Whalley et al. |
| 2006/0121421 A1 | 6/2006 | Spitaels et al. |
| 2006/0126296 A1 | 6/2006 | Campbell et al. |
| 2006/0139877 A1 | 6/2006 | Germagian et al. |
| 2006/0144073 A1 | 7/2006 | Lee et al. |
| 2006/0162357 A1 | 7/2006 | Fink et al. |
| 2006/0168975 A1 | 8/2006 | Malone et al. |
| 2006/0214014 A1 | 9/2006 | Bash et al. |
| 2006/0232945 A1 | 10/2006 | Chu et al. |
| 2006/0242288 A1 | 10/2006 | Masurkar |
| 2006/0250770 A1 | 11/2006 | Campbell et al. |
| 2006/0260338 A1 | 11/2006 | VanGilder et al. |
| 2006/0271700 A1 | 11/2006 | Kawai et al. |
| 2007/0038414 A1 | 2/2007 | Rasmussen et al. |
| 2007/0072536 A1 | 3/2007 | Johnson et al. |
| 2007/0074537 A1 | 4/2007 | Bean et al. |
| 2007/0076373 A1 | 4/2007 | Fink |
| 2007/0078635 A1 | 4/2007 | Rasmussen et al. |
| 2007/0081302 A1 | 4/2007 | Nicolai et al. |
| 2007/0091569 A1 | 4/2007 | Campbell et al. |
| 2007/0091570 A1 | 4/2007 | Campbell et al. |
| 2007/0121295 A1 | 5/2007 | Campbell et al. |
| 2007/0146994 A1 | 6/2007 | Germagian et al. |
| 2007/0150215 A1 | 6/2007 | Spitaels et al. |
| 2007/0163748 A1 | 7/2007 | Rasmussen et al. |
| 2007/0165377 A1 | 7/2007 | Rasmussen et al. |
| 2007/0167125 A1 | 7/2007 | Rasmussen et al. |
| 2007/0171613 A1 | 7/2007 | McMahan et al. |
| 2007/0174024 A1 | 7/2007 | Rasmussen et al. |
| 2007/0187343 A1 | 8/2007 | Colucci et al. |
| 2007/0190919 A1 | 8/2007 | Donovan et al. |
| 2007/0274035 A1 | 11/2007 | Fink et al. |
| 2008/0002364 A1 | 1/2008 | Campbell et al. |
| 2008/0004837 A1 | 1/2008 | Zwinger et al. |
| 2008/0037217 A1 | 2/2008 | Murakami et al. |
| 2008/0041076 A1 | 2/2008 | Tutunoglu et al. |
| 2008/0041077 A1 | 2/2008 | Tutunoglu |
| 2008/0055850 A1 | 3/2008 | Carlson et al. |
| 2008/0055852 A1 | 3/2008 | Uluc et al. |
| 2008/0104985 A1 | 5/2008 | Carlsen |
| 2008/0105412 A1 | 5/2008 | Carlsen et al. |
| 2008/0105753 A1 | 5/2008 | Carlsen et al. |
| 2008/0141703 A1 | 6/2008 | Bean, Jr. |
| 2008/0142068 A1 | 6/2008 | Bean et al. |
| 2008/0174954 A1 | 7/2008 | VanGilder et al. |
| 2008/0245083 A1 | 10/2008 | Tutunoglu et al. |
| 2009/0007591 A1 | 1/2009 | Bean et al. |
| 2009/0030554 A1 | 1/2009 | Bean, Jr. et al. |
| 2009/0138313 A1 | 5/2009 | Morgan et al. |
| 2009/0138888 A1 | 5/2009 | Shah et al. |
| 2009/0150123 A1 | 6/2009 | Archibald et al. |
| 2009/0168345 A1 | 7/2009 | Martini |
| 2009/0205416 A1 | 8/2009 | Campbell et al. |
| 2009/0223234 A1 | 9/2009 | Campbell et al. |
| 2009/0259343 A1 | 10/2009 | Rasmussen et al. |

(56) References Cited

U.S. PATENT DOCUMENTS

| | | |
|---|---|---|
| 2009/0309570 A1 | 12/2009 | Lehmann et al. |
| 2009/0326879 A1 | 12/2009 | Hamann et al. |
| 2009/0326884 A1 | 12/2009 | Amemiya et al. |
| 2010/0057263 A1 | 3/2010 | Tutunoglu |
| 2010/0170663 A1 | 7/2010 | Bean, Jr. |
| 2010/0256959 A1 | 10/2010 | VanGilder et al. |
| 2010/0286956 A1 | 11/2010 | VanGilder et al. |
| 2010/0287018 A1 | 11/2010 | Shrivastava et al. |
| 2011/0040529 A1 | 2/2011 | Hamann et al. |
| 2011/0213508 A1 | 9/2011 | Mandagere et al. |
| 2011/0246147 A1 | 10/2011 | Rasmussen et al. |
| 2012/0041569 A1 | 2/2012 | Zhang et al. |
| 2012/0071992 A1 | 3/2012 | VanGilder et al. |
| 2012/0158387 A1 | 6/2012 | VanGilder et al. |
| 2012/0170205 A1 | 7/2012 | Healey et al. |
| 2012/0221872 A1 | 8/2012 | Artman et al. |
| 2013/0006426 A1 | 1/2013 | Healey et al. |

FOREIGN PATENT DOCUMENTS

| | | |
|---|---|---|
| EP | 0602911 A1 | 6/1994 |
| EP | 1610077 A2 | 12/2005 |
| EP | 1672902 A1 | 6/2006 |
| FR | 2624684 A1 | 6/1989 |
| FR | 2864854 A1 | 7/2005 |
| JP | 63-127042 A | 5/1988 |
| JP | 07269926 A | 10/1995 |
| JP | 09-298377 A | 11/1997 |
| JP | 2001-260640 A | 9/2001 |
| JP | 2002-101973 A | 4/2002 |
| JP | 2002-119339 A | 4/2002 |
| WO | 02/065030 A1 | 8/2002 |
| WO | 2003005200 A1 | 1/2003 |
| WO | 03/083631 A1 | 10/2003 |
| WO | 2003081406 A1 | 10/2003 |
| WO | 2005081091 A2 | 9/2005 |
| WO | 20050122664 A1 | 12/2005 |
| WO | 2006/034718 A1 | 4/2006 |
| WO | 2006119248 A2 | 11/2006 |
| WO | 20060124240 A2 | 11/2006 |
| WO | 2007095144 A2 | 8/2007 |
| WO | 2008144375 A2 | 11/2008 |
| WO | 2009/014893 A1 | 1/2009 |
| WO | 2011/019615 A1 | 2/2011 |

OTHER PUBLICATIONS

Robin Steinbrecher et al.: "Use of Flow Network Modeling (FNM) for the Design of Air-Cooled Servers", Dec. 31, 1999 (Dec. 31, 1999), XP055589843, Retrieved from the Internet: URL:http://citeseerx.ist.psu.edu/viewdoc/dawnload?doi=10.1.1.200.457&rep=rep1&type=pdf [retrieved on May 17, 2019].
"Case Study, Application of TileFlow to Improve Cooling in a Data Center," Innovative Research, Inc., 2004.
"Essential Cooling System Requirements for Next Generation Data Centers," White Paper #5, Revision 3, 2003 American Power Conversion, Rev 2002-3, pp. 1-10.
"How and Why Mission-Critical Cooling Systems Differ From Common Air Conditions," White Paper #56, Revision 2, 2003 American Power Conversion, Rev 2003-2, pp. 1-13.
"Management Strategy for Network Critical Physical Infrastructure", White Paper #100, pp. 110, American Power Conversion, Dec. 15, 2003, published on World Wide Web.
"Optimizing facility operation in high density data center environments," 2007, Hewlett-Packard Development Company, pp. 1-25.
Abi-Zadeh, Davar et al., "A Transient Analysis of Environmental Conditions for a Mission Critical Facility after a Failure of Power", Arup Mission Criticial Facilities, Feb. 2001, pp. 1-12.
Ahmad, Jasim U. et al., "Navier-Stokes simulation of air-conditioning facility of a large modern computer room," Jun. 2005, Proceedings of the 2005 ASME Fluids Engineering Division Summer Meeting and Exhibition, pp. 1-6.

Anderson, Donald, "Iterative Procedures for Nonlinear Integral Equations," Journal of the Association for Computing Machinery, vol. 12, No. 4, Oct. 1965, pp. 547-560.
APC User's Guide Brochure, "InfraStruXure Manager," Mar. 2004, 181 pgs.
Ashrae, "Thermal Guidelines for Data Processing Environments" 2004, Atlanta: American Society of Heating, Refrigerating, and Air-Conditioning Engineers, Inc., 2004, Atlanta.
Bash, C. E. et al.: "Balance of Power: Dynamic Thermal Management for Internet Data Centers", IEEE Internet Computing , Jan. 1, 2005, pp. 42-49, vol. 9, No. 1, IEEE Service Center, New York, NY.
Bash, C.E., Patel, C.D., and Sharma, R.K., "Efficient Thermal Management of Data Centers—Immediate and Long-Term Research Needs" Intl. J. Heat, Ventilating, Air-Conditioning and Refrigeration Research, 2003, pp. 137-152, vol. 9, No. 2.
Beaty et al., "High Density Cooling of Data Centers and Telecom Facilities—Part 2," 2005, ASHRAE Transactions, vol. 111, pp. 932-944.
Bemis et al, Data Center Airflow Modeling: Helps Facilities Planners Make Informed Decisions. Applied Math Modeling Inc. 2009 [retrieved on Apr. 19, 2012). Retrieved from the Internet: <URL: http:l/www.coolsimsoftware.com/wwwrooULinkCiick.aspx?fileticket=r1 SqFUDtRTk%3D&tabid=189> entire document.
Chandrakant D. Patel, et al., "Thermal Considerations in Cooling Large Scale High Copute Density Data Centers" IEEE 2002, pp. 767-776.
Dvinsky: "Hot Tips for Using Cooling Software a Little Planning Lets Users Get More from Their Thermal-Simulation Software", Machine Design, Penton Media, Cleveland, OH, vol. 72, No. 4, Feb. 24, 2000.
Ehsan Pakabaznia et al., "Miminizing data center cooling and server power costs", Proceedings of the 14th ACM/IEEE International Symposium on Low Power Electronics and Design, ISLPED '09, Jan. 1, 2009 (Jan. 1, 2009), p. 145, XP55015368, New York, New York, USA, DOI: 10.1145/1594233.1594268, ISBN: 978-1-60-558684-7.
Herrlin, M.K., "Rack Cooling Effectiveness in Data Centers and Telecom Central Offices: The Rack Cooling Index (RCI)," ASHRAE Transaction, 2005, pp. 725-731, vol. 111(2).
Innovative Research, Inc., http://web.archive.org/web/20051221005029/ http://www.inres.com/, Dec. 21, 2005, published on World Wide Web.
Jeffrey Rambo et al., "Modeling of data center airflow and heat transfer: State of the art and future trends", Distributed and Parallel Databases, Kluwer Academic Publishers, BO, vol. 21, No. 2-3, Jan. 20, 2007 (Jan. 20, 2007), pp. 193-225, XP019499845, ISSN: 1573-7578, DOI:10.1007/S10619-006-7007-3.
Jeonghwan Choi et al., "A CFD-Based Tool for Studying Temperature in Rack-Mounted Servers", IEEE Transactions on Computers, IEEE Service Center, Los Alamitos, CA, US, vol. 57, No. 8, Aug. 1, 2008 (Aug. 1, 2008), pp. 1129-1142, ISSN: 0018-9340, DOI: 10.1109/TC.2008.52.
K. Dunlap, "Cooling Audit for Identifying Potential Cooling Problems in Data Centers", White Paper #40, pp. 1-18, American Power Conversion, May 20, 2004, published on World Wide Web.
Karki et al., "Techniques for Controlling Airflow Distribution in Raised-Floor Data Centers," The Pacific Rim/ASME International Electronic Packaging Technical Conference and Exhibition, Jul. 13, 2003.
Le et al., "Operating Behaviour of Single Split Coil Systems Under Modulating and Two-Position Control", Published 2005 by American Society of Heating, Refrigerating and Air-Conditioning Engineers, Inc.
Modern Refrigeration and Air Conditioning (18th Edition) Althouse et al. Published by The Goodheart-Willcox Company, Inc. (c)2000.
N. Rasmussen, "Calculating Total Cooling Requirements for Data Centers", White Paper #25, pp. 1-8, American Power Conversion, May 20, 2004, published on World Wide Web.
N. Rasmussen, "Cooling Strategies for Ultra-High Density Racks and Blade Servers", White Paper #46, pp. 1-22, American Power Conversion, Mar. 29, 2005, published on World Wide Web.

(56) References Cited

OTHER PUBLICATIONS

N. Rasmussen, "Strategies for Deploying Blade Servers in Existing Data Centers", White Paper #125, pp. 1-14, American Power Conversion, Mar. 29, 2005, published on World Wide Web.

Neil Rasmussen, "Air Distribution Architecture Options for Mission Critical Facilities," White Paper #55, Revision 1, 2003 American Power Conversion, Rev 2003-0, pp. 1-13.

Neil Rasmussen, "Avoidable Mistakes that Compromise Cooling Performance in Data Centers and Network Rooms," White Paper #49, 2003 American Power Conversion, Rev 2003-0, pp. 1-15.

Neil Rasmussen, "Cooling Options for Rack Equipment with Side-to-Side Airflow," White Paper #50, 2004 American Power Conversion, Rev 2004-0, pp. 1-14.

Neil Rasmussen, "Guidelines for Specification of Data Center Power Density," White Paper #120, 2005 American Power Conversion, Rev 2005-0, pp. 1-21.

Pakbaznia, E.; Ghasemazar, M.; Pedram, M.:, "Temperature-aware dynamic resource provisioning in a power-optimized datacenter," Design, Automation & Test in Europe Conference & Exhibition (DATE), 2010, vol., No., pp. 124-129, Mar. 8-12, 2010.

Pinheiro, Eduardo, "Load Balancing and Unbalancing for Power and Performance in Cluster-Based Systems," Internet Citation, May 1, 2001 URL:http://research.ac.upc.es/pact01/colp/paper04.pdf, retrieved on Nov. 17, 2003.

Refai-Ahmed G. et al., "Analysis of flow distribution in power supply using flow network modeling (FNM)", Thermal and Thermomechanical Phenomena in Electronic Systems, 2000, IT HERM 2000, The Seventh Intersociety Conference on May 23-26, 2000, Piscataway, NJ, USA, IEEE, Piscataway, NJ, USA, vol. 1, May 23, 2000 (May 23, 2000), pp. 90-98, ISBN: 978-0-7803-5912-3.

Rittal Catalogue, Aug. 2005, p. 115 and p. 140.

Rittal, Catalogue 31, front page p. 672 and back page, Apr. 2005.

Schmidt et al., "Best practices for data center thermal and energy management-review of literature," ASHRAE Transactions, vol. 112, pp. 206-218 [2007].

Sharma, R.K, Bash, C.E., and Patel, C.D, "Dimensionless Parameters for Evaluation of Thermal Design and Performance of Large-Scale Data Centers." 8th ASME/AIAA Joint Thermophysics and Heat Transfer Conference, Jun. 24-26, 2002. St. Louis, Missouri.

Shrivastava S K et al., Optimization of Cluster Cooling Performance for Data Centers, Thermal and Thermomechanical Phenomena in Electronic Systems, May 28, 2008, pp. 1161-1166, 11th Intersociety Conference on, IEEE, Piscataway, NJ.

Shrivastava S.K. et al., "A flow-network model for predicting rack cooling in containment systems", Proceedings of the ASME Interpack Conference—2009: Presented at 2009 ASME Interpack Conference, Jul. 19-23, 2009, San Francisco, California, USA, vol. 2, Jul. 19, 2009 (Jul. 19, 2009), pp. 785-791.

Tony Evans, "Humidification Strategies for Data Centers and Network Rooms," WHite Paper 58, 2004 American Power Conversion, Rev 2004-0, pp. 1-13.

Tony Evans, "The Different Types of Air Conditioning Equipment for IT Environments," White Paper #59, 2004 American Power Conversion, Rev 2004-0, pp. 1-21.

Toulouse M.M. et al., "Exploration of a potential-flow-based compact model of air-flow transport in data centers", Proceedings of the ASME International Mechanical Engineering Congress and Exposition—2009: Presented at 2009 ASME International Mechanical Engineering Congress and Exposition, Nov. 13-19, 2009, Lake Buena Vista, Florida, USA, vol. 13: New Del, vol. 13, Jan. 1, 2009 (Jan. 1, 2009), pp. 41-50, DOI: 10.1115/IMECE2009-10806, ISBN: 978-0-7918-4386-4.

Vanessa Lopez et al., "Measurement-based modeling for data centers", Thermal and Thermomechanical Phenomena in Electronic Systems (ITHERM), 2010 12th IEEE Intersociety Conference on, IEEE, Piscataway, NJ, USA, Jun. 2, 2010 (Jun. 2, 2010), pp. 1-8, XP031702357.

VanGilder et al., "Airflow Uniformity through Perforated Tiles in a Raised-Floor Data Center", White Paper 121, Jul. 17-22, 2005, 10 pages.

VanGilder et al., "Partially decoupled aisle method for estimating rack-cooling performance in near-real time," 2007, Proceedings of the IPACK2007 ASME InterPACK07, pp. 781-789.

VanGilder, James W. et al., "Caputure index: an airflow-based rack cooling performance metric," 2007, ASHRAE Transactions, vol. 113, pp. 126-136.

VanGilder, James W. et al., "Real-Time prediction of rack-cooling performance," 2006, ASHRAE Transactions, vol. 112, pp. 151-162.

| rack power (kW) | 3.0 | | 8.0 | 5.0 | | 2.0 |
|---|---|---|---|---|---|---|
| rack cfm/kW | 160 | | 160 | 160 | | 160 |
| rack airflow (cfm) | 480 | | 1280 | 800 | | 320 |
| cooler airflow (cfm) | | c | | | c | |
| Rack Cl/CoolerTemp. (°F) | 100% | | 100% | 100% | | 100% |

Hot Aisle

| Rack Cl/CoolerTemp. (F) | 100% | 100% | | 100% | 100% |
|---|---|---|---|---|---|
| cooler airflow (cfm) | | | c | | |
| rack airflow (cfm) | 160 | 960 | | 1120 | 640 |
| rack cfm/kW | 160 | 160 | | 160 | 160 |
| rack power (kW) | 1.0 | 6.0 | | 7.0 | 4.0 |

FIG. 5

SYSTEM AND METHOD FOR ARRANGING EQUIPMENT IN A DATA CENTER

RELATED APPLICATIONS

This application is a continuation of U.S. patent application Ser. No. 13/544,343, filed Jul. 9, 2012 titled "SYSTEM AND METHOD FOR ARRANGING EQUIPMENT IN A DATA CENTER," which is a continuation of U.S. application Ser. No. 12/437,734, filed May 8, 2009, now U.S. Pat. No. 8,219,362, titled "SYSTEM AND METHOD FOR ARRANGING EQUIPMENT IN A DATA CENTER," each of which is incorporated herein by reference in its entirety.

BACKGROUND

Field of the Invention

At least one embodiment in accordance with the present invention relates generally to systems and methods for data center management and design, and more specifically, to systems and methods for managing data center air flow and energy usage and for arranging equipment in a data center based on air flow and energy usage.

Discussion of Related Art

In response to the increasing demands of information-based economies, information technology networks continue to proliferate across the globe. One manifestation of this growth is the centralized network data center. A centralized network data center typically consists of various information technology equipment, collocated in a structure that provides network connectivity, electrical power and cooling capacity. Often the equipment is housed in specialized enclosures termed "racks" which integrate connectivity, power and cooling elements. In some data center configurations, rows of racks are organized into hot and cold aisles to decrease the cost associated with cooling the information technology equipment. These characteristics make data centers a cost effective way to deliver the computing power required by many software applications.

Various processes and software applications, such as the InfrastruXure® Central product available from American Power Conversion Corporation of West Kingston, R.I., have been developed to aid data center personnel in designing and maintaining efficient and effective data centers configurations. These tools often guide data center personnel through activities such as designing the data center structure, positioning equipment within the data center prior to installation and repositioning, removing, and adding equipment after construction and installation are complete. Thus, conventional tool sets provide data center personnel with a standardized and predictable design methodology.

SUMMARY OF THE INVENTION

A first aspect of the invention is directed to a computer-implemented method for providing a layout of equipment in a data center, the equipment including a plurality of equipment racks, and at least one cooling provider. The method includes receiving data regarding airflow consumption for each of the plurality of equipment racks and cooling capacity of the at least one cooling provider, storing the received data determining a layout of the data center, and displaying the layout of the data center. Determining a layout may include pairing each equipment rack of the plurality of equipment racks with another equipment rack of the plurality of equipment racks based on airflow consumption of each of the plurality of equipment racks to create a plurality of pairs of equipment racks, determining a combined airflow consumption value for each of the pairs of equipment racks, arranging the pairs of equipment racks to form a two-row cluster of equipment racks based on the combined power consumption value of the equipment racks, wherein each pair includes an equipment rack in a first row of the cluster and an equipment rack in a second row of the cluster, and determining a location of the at least one cooling provider in the cluster.

In the method, pairing each equipment rack may include pairing a greatest airflow consuming equipment rack with a least airflow consuming equipment rack, and pairing a second greatest airflow consuming equipment rack with a second least airflow consuming rack. Arranging the pairs of equipment racks may include identifying a rack pair having a greatest combined airflow consumption value, a rack pair having a least combined airflow consumption value, and a rack pair having a second least combined airflow consumption value, and positioning the rack pair having the greatest combined airflow consumption value in a middle position of the cluster, arranging the rack pair having the least combined airflow consumption value at a first end of the cluster, and arranging the rack pair having the second least combined power consumption value at a second end of the cluster.

In the method, determining a location for the at least one cooling provider may include determining an interior position for the at least one cooling provider adjacent two equipment racks. The method may further include receiving information related to a desired cooling redundancy for at least one of the equipment racks, and determining a layout may include determining a layout based at least in part on the information related to a desired cooling redundancy. After determining the layout, the method may include providing an optimized layout using an optimization routine. The method may also include positioning the equipment in the data center in accordance with the determined layout.

Another aspect of the invention is directed to a system for providing a layout of equipment in a data center, the equipment including a plurality of equipment racks, and at least one cooling provider. The system includes a display, a storage device, an interface, and a controller coupled to the display, the storage device and the interface and configured to receive through the interface data regarding airflow consumption for each of the plurality of equipment racks and cooling capacity of the at least one cooling provider, store the received data in the storage device, determine a layout of the data center, and display the layout of the data center on the display. Determining a layout may include pairing each equipment rack of the plurality of equipment racks with another equipment rack of the plurality of equipment racks based on airflow consumption of each of the plurality of equipment racks to create a plurality of pairs of equipment racks, determining a combined airflow consumption value for each of the pairs of equipment racks, arranging the pairs of equipment racks to form a two-row cluster of equipment racks based on the combined airflow consumption value of the equipment racks, wherein each pair includes an equipment rack in a first row of the cluster and an equipment rack in a second row of the cluster, and determining a location of the at least one cooling provider in the cluster.

In the system, pairing each equipment rack may include pairing a greatest airflow consuming equipment rack with a least airflow consuming equipment rack, and pairing a second greatest airflow consuming equipment rack with a second least airflow consuming rack. In the system, arranging the pairs of equipment racks may includes identifying a rack pair having a greatest combined airflow consumption value, a rack pair having a least combined airflow consumption value, and a rack pair having a second least combined airflow consumption value, and positioning the rack pair having the greatest combined airflow consumption value in a middle position of the cluster, arranging the rack pair having the least combined airflow consumption value at a first end of the cluster, and arranging the rack pair having the second least combined airflow consumption value at a second end of the cluster.

In the system, determining a location for the at least one cooling provider may include determining an interior position for the at least one cooling provider adjacent two equipment racks. Further, the controller may be configured to receive information related to a desired cooling redundancy for at least one of the equipment racks, and may be configured to determine a layout based at least in part on the information related to a desired cooling redundancy. The controller may be further configured to determine an optimized layout using an optimization routine having the determined layout as an input.

Another aspect of the invention is directed to a computer readable medium having stored thereon sequences of instruction including instructions that will cause a processor to receive data regarding airflow consumption for each of a plurality of equipment racks and cooling capacity of at least one cooling provider contained in a data center, store the received data in a storage device, determine a layout of the data center, and display the layout of the data center on a display. The instructions for determining a layout may include pairing each equipment rack of the plurality of equipment racks with another equipment rack of the plurality of equipment racks based on airflow consumption of each of the plurality of equipment racks to create a plurality of pairs of equipment racks, determining a combined airflow consumption value for each of the pairs of equipment racks, arranging the pairs of equipment racks to form a two-row cluster of equipment racks based on the combined airflow consumption value of the equipment racks, wherein each pair includes an equipment rack in a first row of the cluster and an equipment rack in a second row of the cluster, and determining a location of the at least one cooling provider in the cluster.

In the instructions, pairing each equipment rack may include pairing a greatest airflow consuming equipment rack with a least airflow consuming equipment rack, and pairing a second greatest airflow consuming equipment racks with a second least airflow consuming rack. Further, arranging the pairs of equipment rack may include identifying a rack pair having a greatest combined airflow consumption value, a rack pair having a least combined airflow consumption value, and a rack pair having a second least combined airflow consumption value, and positioning the rack pair having the greatest combined airflow consumption value in a middle position of the cluster, arranging the rack pair having the least combined airflow consumption value at a first end of the cluster, and arranging the rack pair having the second least combined airflow consumption value at a second end of the cluster. Still further, determining a location for the at least one cooling provider may include determining an interior position for the at least one cooling provider adjacent two equipment racks. The computer readable medium may further include instructions that will cause the processor to receive information related to a desired cooling redundancy for at least one of the equipment racks, and determine a layout may include determining a layout based at least in part on the information related to a desired cooling redundancy. The medium may also include instructions that will cause the processor to determine an optimized layout using an optimization routine having the determined layout as an input.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

At least some embodiments in accordance with the present invention relate to systems and processes through which a user may design data center configurations. These systems may facilitate this design activity by allowing the user to create models of data center configurations from which performance metrics may be determined. Both the systems and the user may employ these performance metrics to determine alternative data center configurations that meet various design objectives. Further, in at least one embodiment, a system will provide an initial layout of data center equipment and conduct a cooling analysis on the layout in real time.

As described in U.S. patent application Ser. No. 12/019109, titled "System and Method for Evaluating Equipment Rack Cooling", filed Jan. 24, 2008, and in U.S. patent application Ser. No. 11/342,300, titled "Methods and Systems for Managing Facility Power and Cooling" filed Jan. 27, 2006 both of which are assigned to the assignee of the present application, and both of which are hereby incorporated herein by reference in their entirety, typical equipment racks in modern data centers draw cooling air in the front of the rack and exhaust air out the rear of the rack. The equipment racks, and in-row coolers are typically arranged in rows in an alternating front/back arrangement creating alternating hot and cool aisles in a data center with the front of each row of racks facing the cool aisle and the rear of each row of racks facing the hot aisle. Adjacent rows of equipment racks separated by a cool aisle may be referred to as a cool or cold aisle cluster, and adjacent rows of equipment racks separated by a hot aisle may be referred to as a hot aisle cluster. As readily apparent to one of ordinary skill in the art, a row of equipment racks may be part of one hot aisle cluster and one cool aisle cluster. In descriptions and claims herein, equipment in racks, or the racks themselves, may be referred to as cooling consumers, and in-row cooling units and/or computer room air conditioners (CRACs) may be referred to as cooling providers. In the referenced applications, tools are provided for analyzing the cooling performance of a cluster of racks in a data center. In these tools, multiple analyses may be performed on different layouts to attempt to optimize the cooling performance of the data center.

In embodiments, of the invention, different cooling performance metrics may be used to evaluate the cooling performance of a cluster. These metrics include capture index (CI) and recirculation index (RI) both of which are described in further detail in the applications, incorporated by reference above. In general, for a hot aisle cluster, the capture index indicates for each rack the percentage of the rack exhaust air that is captured by all of the coolers in the cluster. For a cool aisle cluster, the capture index indicates for each rack the percentage of rack airflow that is supplied directly by local cooling providers.

In at least one embodiment, a model of a data center is generated and displayed and a cooling analysis is provided of the data center. In creating a model, in at least one embodiment, a user may define a set of equipment racks and cooling providers to be included in a cluster, and the system will automatically arrange the equipment racks and the cooling providers in the cluster in a manner that will satisfy cooling requirements of the equipment racks.

The aspects disclosed herein in accordance with the present invention, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment of the present invention, a computer system is configured to perform any of the functions described herein, including but not limited to, configuring, modeling and presenting information regarding specific data center configurations. Further, computer systems in embodiments of the data center may be used to automatically measure environmental parameters in a data center, and control equipment, such as chillers or coolers to optimize performance Moreover, the systems described herein may be configured to include or exclude any of the functions discussed herein. Thus the invention is not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Computer System

Various aspects and functions described herein in accordance with the present invention may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects in accordance with the present invention may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accordance with the present invention may be implemented within methods, acts, systems, system elements and components using a variety of hardware and software configurations, and the invention is not limited to any particular distributed architecture, network, or communication protocol.

Figure 1:
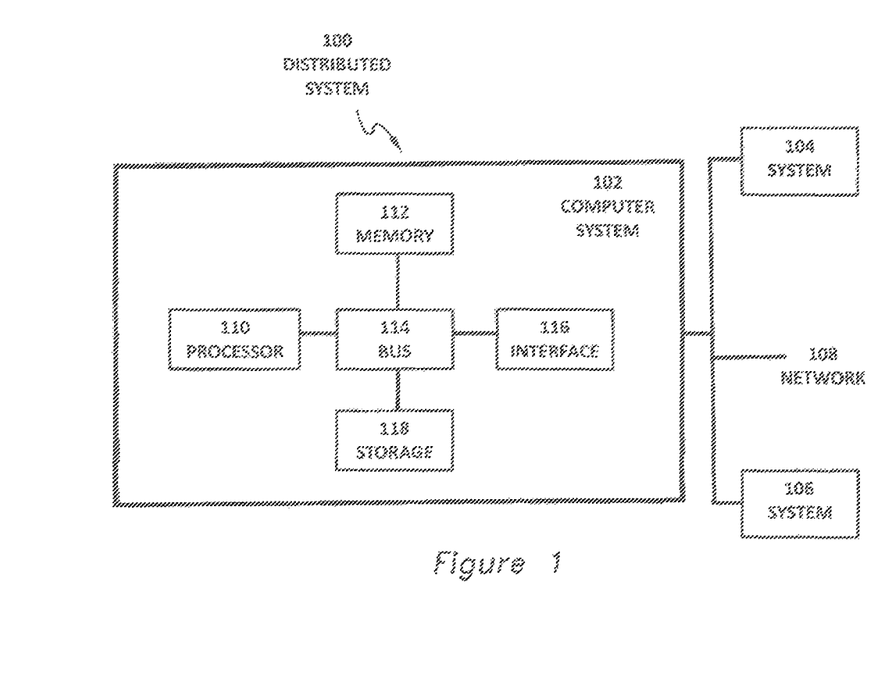
FIG. 1 shows an example computer system with which various aspects in accord with the present invention may be implemented.

FIG. 1 shows a block diagram of a distributed computer system 100, in which various aspects and functions in accord with the present invention may be practiced. Distributed computer system 100 may include one more computer systems. For example, as illustrated, distributed computer system 100 includes computer systems 102, 104 and 106. As shown, computer systems 102, 104 and 106 are interconnected by, and may exchange data through, communication network 108. Network 108 may include any communication network through which computer systems may exchange data. To exchange data using network 108, computer systems 102, 104 and 106 and network 108 may use various methods, protocols and standards, including, among others, token ring, ethernet, wireless ethernet, Bluetooth, TCP/IP, UDP, Http, FTP, SNMP, SMS, MMS, SS7, Json, Soap, and Corba. To ensure data transfer is secure, computer systems 102, 104 and 106 may transmit data via network 108 using a variety of security measures including TSL, SSL or VPN among other security techniques. While distributed computer system 100 illustrates three networked computer systems, distributed computer system 100 may include any number of computer systems and computing devices, networked using any medium and communication protocol.

Various aspects and functions in accordance with the present invention may be implemented as specialized hardware or software executing in one or more computer systems including computer system 102 shown in FIG. 1. As depicted, computer system 102 includes processor 110, memory 112, bus 114, interface 116 and storage 118. Processor 110 may perform a series of instructions that result in manipulated data. Processor 110 may be a commercially available processor such as an Intel Pentium, Motorola PowerPC, SGI MIPS, Sun UltraSPARC, or Hewlett-Packard PA-RISC processor, but may be any type of processor or controller as many other processors and controllers are available. Processor 110 is connected to other system elements, including one or more memory devices 112, by bus 114.

Memory 112 may be used for storing programs and data during operation of computer system 102. Thus, memory 112 may be a relatively high performance, volatile, random access memory such as a dynamic random access memory (DRAM) or static memory (SRAM). However, memory 112 may include any device for storing data, such as a disk drive or other non-volatile storage device. Various embodiments in accordance with the present invention may organize memory 112 into particularized and, in some cases, unique structures to perform the aspects and functions disclosed herein.

Components of computer system 102 may be coupled by an interconnection element such as bus 114. Bus 114 may include one or more physical busses, for example, busses between components that are integrated within a same machine, but may include any communication coupling between system elements including specialized or standard computing bus technologies such as IDE, SCSI, PCI and InfiniBand. Thus, bus 114 enables communications, for example, data and instructions, to be exchanged between system components of computer system 102.

Computer system 102 also includes one or more interface devices 116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118 may include a computer readable and writeable nonvolatile storage medium in which instructions are stored that define a program to be executed by the processor. Storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor or some other controller may cause data to be read from the nonvolatile recording medium into another memory, such as memory 112, that allows for faster access to the information by the processor than does the storage medium included in storage system 118. The memory may be located in storage system 118 or in memory 112, however, processor 110 may manipulate the data within the memory 112, and then copies the data to the medium associated with storage system 118 after processing is completed. A variety of components may manage data movement between the medium and integrated circuit memory element and the invention is not limited thereto. Further, the invention is not limited to a particular memory system or storage system.

Although computer system 102 is shown by way of example as one type of computer system upon which various aspects and functions in accordance with the present invention may be practiced, aspects of the invention are not limited to being implemented on the computer system as shown in FIG. 1. Various aspects and functions in accord with the present invention may be practiced on one or more computers having a different architectures or components than that shown in FIG. 1. For instance, computer system 102 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating system available from various sources. Many other operating systems may be used, and embodiments are not limited to any particular implementation.

The processor and operating system together define a computer platform for which application programs in high-level programming languages may be written. These component applications may be executable, intermediate, for example, C–, bytecode or interpreted code which communicates over a communication network, for example, the Internet, using a communication protocol, for example, TCP/IP. Similarly, aspects in accord with the present invention may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions in accordance with the present invention may be implemented in a non-programmed environment, for example, documents created in HTML, XML or other format that, when viewed in a window of a browser program, render aspects of a graphical-user interface or perform other functions. Further, various embodiments in accord with the present invention may be implemented as programmed or non-programmed elements, or any combination thereof. For example, a web page may be implemented using HTML while a data object called from within the web page may be written in C++. Thus, the invention is not limited to a specific programming language and any suitable programming language could also be used. Further, in at least one embodiment, the tool may be implemented using VBA Excel.

A computer system included within an embodiment may perform additional functions outside the scope of the invention. For instance, aspects of the system may be implemented using an existing commercial product, such as, for example, Database Management Systems such as SQL Server available from Microsoft of Seattle Wash., Oracle Database from Oracle of Redwood Shores, Calif., and MySQL from MySQL AB of Uppsala, Sweden or integration software such as Web Sphere middleware from IBM of Armonk, N.Y. However, a computer system running, for example, SQL Server may be able to support both aspects in accord with the present invention and databases for sundry applications not within the scope of the invention.

Example System Architecture

Figure 2:
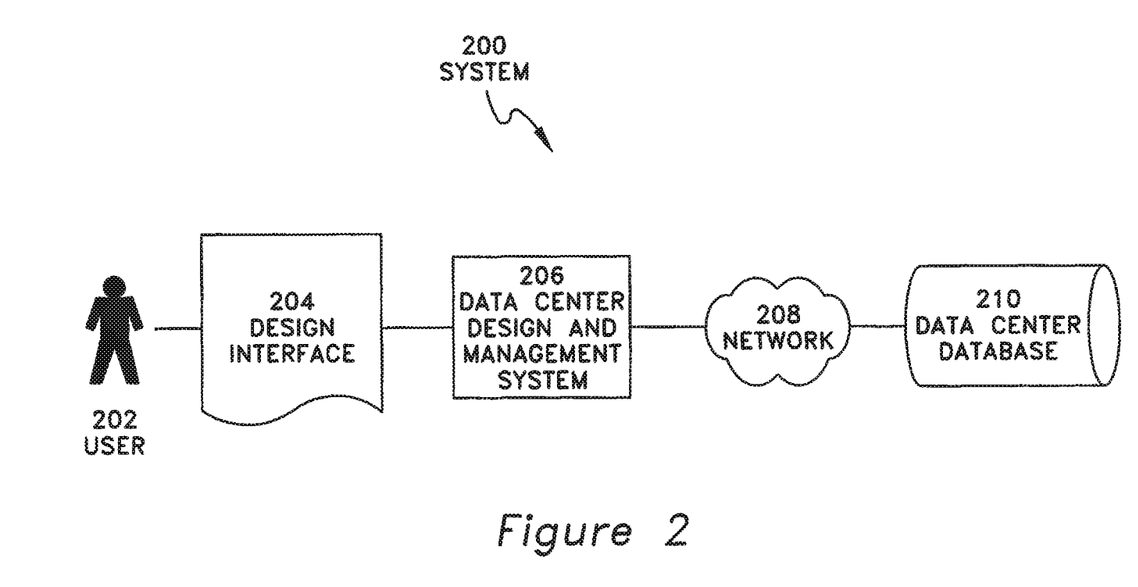
FIG. 2 illustrates an example distributed system including an embodiment.

FIG. 2 presents a context diagram including physical and logical elements of distributed system 200. As shown, distributed system 200 is specially configured in accordance with the present invention. The system structure and content recited with regard to FIG. 2 is for exemplary purposes only and is not intended to limit the invention to the specific structure shown in FIG. 2. As will be apparent to one of ordinary skill in the art, many variant system structures can be architected without deviating from the scope of the present invention. The particular arrangement presented in FIG. 2 was chosen to promote clarity.

Information may flow between the elements, components and subsystems depicted in FIG. 2 using any technique. Such techniques include, for example, passing the information over the network via TCP/IP, passing the information between modules in memory and passing the information by writing to a file, database, or some other non-volatile storage device. Other techniques and protocols may be used without departing from the scope of the invention.

Referring to FIG. 2, system 200 includes user 202, interface 204, data center design and management system 206, communications network 208 and data center database 210. System 200 may allow user 202, such as a data center architect or other data center personnel, to interact with interface 204 to create or modify a model of one or more data center configurations. According to one embodiment, interface 204 may include aspects of the floor editor and the rack editor as disclosed in Patent Cooperation Treaty Application No. PCT/US08/63675, entitled METHODS AND SYSTEMS FOR MANAGING FACILITY POWER AND COOLING, filed on May 15, 2008, which is incorporated herein by reference in its entirety and is hereinafter referred to as PCT/US08/63675. In other embodiments, interface 204 may be implemented with specialized facilities that enable user 202 to design, in a drag and drop fashion, a model that includes a representation of the physical layout of a data center or any subset thereof. This layout may include representations of data center structural components as well as data center equipment. The features of interface 204, as may be found in various embodiments in accordance with the present invention, are discussed further below. In at least one embodiment, information regarding a data center is entered into system 200 through the interface, and assessments and recommendations for the data center are provided to the user. Further, in at least one embodiment, optimization processes may be performed to optimize cooling performance and energy usage of the data center.

As shown in FIG. 2, data center design and management system 206 presents data design interface 204 to user 202. According to one embodiment, data center design and management system 206 may include the data center design and management system as disclosed in PCT/US08/63675. In this embodiment, design interface 204 may incorporate functionality of the input module, the display module and the builder module included in PCT/US08/63675 and may use the database module to store and retrieve data.

As illustrated, data center design and management system 206 may exchange information with data center database 210 via network 208. This information may include any information required to support the features and functions of data center design and management system 206. For example, in one embodiment, data center database 210 may include at least some portion of the data stored in the data center equipment database described in PCT/US08/63675. In another embodiment, this information may include any information required to support interface 204, such as, among other data, the physical layout of one or more data center model configurations, the production and distribution characteristics of the cooling providers included in the model configurations, the consumption characteristics of the cooling consumers in the model configurations, and a listing of equipment racks and cooling providers to be included in a cluster.

In one embodiment, data center database 210 may store types of cooling providers, the amount of cool air provided by each type of cooling provider, and a temperature of cool air provided by the cooling provider. Thus, for example, data center database 210 includes records of a particular type of CRAC unit that is rated to deliver airflow at the rate of 5,600 cfm at a temperature of 68 degrees Fahrenheit. In addition, the data center database 210 may store one or more cooling metrics, such as inlet and outlet temperatures of the CRACs and inlet and outlet temperatures of one or more equipment racks. The temperatures may be periodically measured and input into the system, or in other embodiments, the temperatures may be continuously monitored using devices coupled to the system 200.

Data center database 210 may take the form of any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The computer systems shown in FIG. 2, which include data center design and management system 206, network 208 and data center equipment database 210, each may include one or more computer systems. As discussed above with regard to FIG. 1, computer systems may have one or more processors or controllers, memory and interface devices. The particular configuration of system 200 depicted in FIG. 2 is used for illustration purposes only and embodiments of the invention may be practiced in other contexts. Thus, embodiments of the invention are not limited to a specific number of users or systems.

Data Center Assessment and Optimization Embodiments

Figure 3:
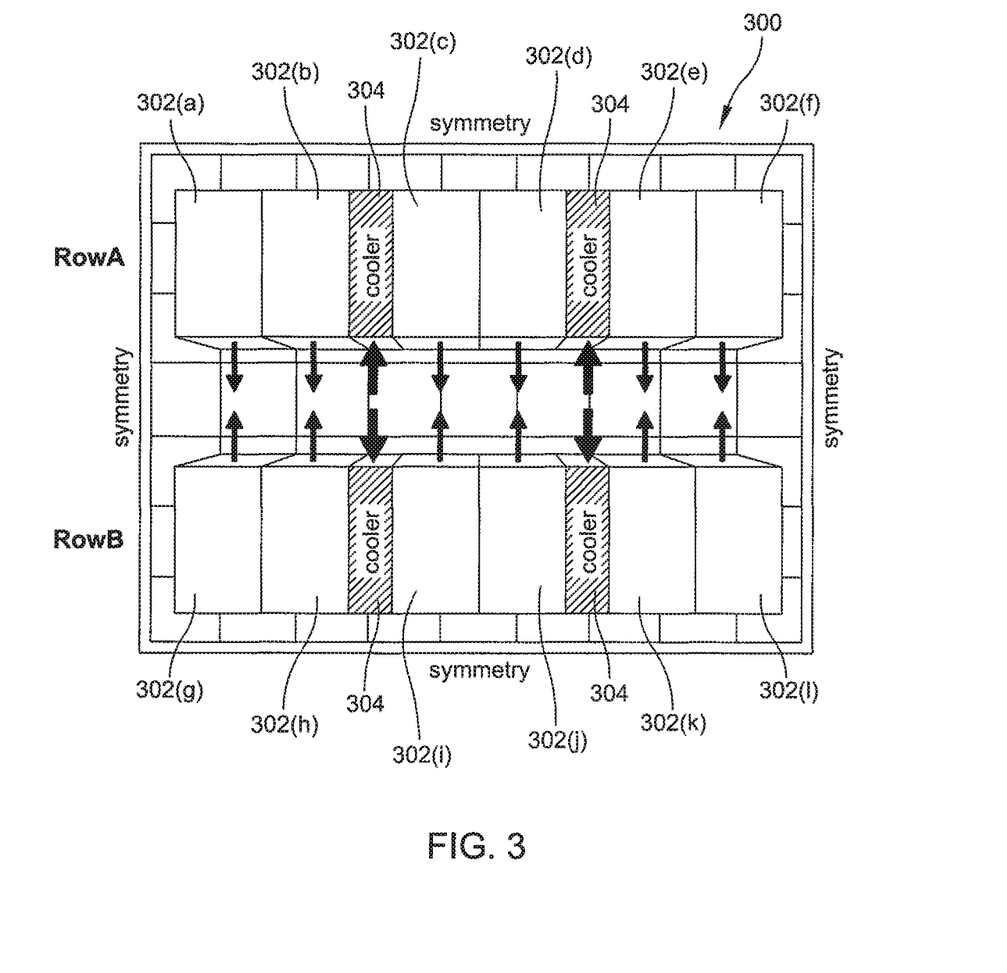
FIG. 3 shows an example layout of equipment racks and coolers in a data center.

In at least one embodiment, which will now be described, a tool is provided that arranges a list of equipment (racks, coolers, UPS's, PDU's, etc.) in real time and displays the equipment in a cluster layout model, such that the rack airflows and the cooling airflows get evenly distributed in the cluster layout. FIG. 3 shows an example of a cluster 300 of racks and coolers arranged in two rows A and B about a hot aisle in a data center. In at least one embodiment, the layout shown in FIG. 3 may be provided as an output of the tool, or the layout may be provided as an input, and the tool can arrange the equipment and coolers to meet specified cooling criteria.

The cluster 300 includes 12 racks 302(a)-302(1), and four in-row coolers 304. The racks in one example are industry standard 19-inch equipment racks and the coolers are half-rack-width in-row coolers having a width that is approximately half that of a standard equipment rack such as coolers available from American Power Conversion Corporation of West Kingston, R.I., including In Row RC (IRRC), model ACRC100. However, embodiments of the invention may be used with other coolers and equipment racks as well. Further, the cluster shown in FIG. 3 is a hot-aisle cluster configured with the backs of the racks in Row A facing the backs of the racks in Row B. In other embodiments, systems and tools of embodiments of the invention may be configured for analysis and layout of equipment racks in a cold-aisle cluster as well.

In one example, which will now be described, input data for a cluster is provided by a user. In one embodiment, the input data is manually entered into the system, however, in other embodiments, the data may be provided electronically from another system. The input data includes a list of racks with rack powers and airflow rates (cfm/kW), type of coolers with cooling airflow (cfm), power zone configurations and the desired cooling redundancy or target air ratio (discussed in detail below). The power zone configurations describe the connectivity of racks or coolers to PDU and UPS power sources; this information is relevant to the arrangement algorithm because there may be preferred equipment locations based on minimizing power cabling or other considerations. Using the input data, the tool calculates the required number of coolers based on the total rack airflow and the desired cooling redundancy, and provides a layout for the racks and coolers and any in-row PDU's and UPS's.

Table 1 provides a list of rack power and rack airflow for one example with the racks arranged in ascending order based on rack power.

TABLE 1

List of Rack Powers and Rack Airflow Sorted Rack Airflow

| Rack Power (kW) | Rack Airflow (cfm) |
| --- | --- |
| 1 | 160 |
| 2 | 320 |
| 3 | 480 |
| 4 | 640 |
| 5 | 800 |
| 6 | 960 |
| 7 | 1120 |
| 8 | 1280 |

In one embodiment, the tool automatically arranges the racks using a process that involves two major steps; first, racks are arranged in the cluster, and second coolers are positioned in the cluster. In laying out the racks, the racks are first paired and arranged in two rows A and B such that the sum of airflow for each rack pair and total rack airflow of Row A and Row B are equal or near equal. In pairing the racks, the rack having the smallest rack airflow is paired with the rack having the largest rack airflow, the rack having the second smallest rack airflow is paired with the rack having the second largest rack airflow, and so on, until all racks are paired up. The racks of each pair are arranged with one of the racks in Row A and the other rack in Row B with the backs of the racks facing each other (in a cold aisle implementation, the fronts of the racks would face each other). For scenarios with an odd number of racks, the rack having the highest airflow is paired with a fictitious rack having no airflow.

The rack pairs are then arranged in Row A and Row B by first selecting the first pair (smallest airflow rack and largest airflow rack) and then placing the other rack pairs alternatively on either side of the first pair such that the smaller airflow rack of a pair gets the larger airflow rack of other pairs as its neighbors. Table 2 shows the racks of Table 1 arranged according to the above-described process.

TABLE 2

Rack Pairs Arranged in Row A and Row B

| RowA, Rack airflow (cfm) | 480 | 1280 | 320 | 800 |
| --- | --- | --- | --- | --- |
| RowB, Rack airflow (cfm) | 960 | 160 | 1120 | 640 |
| Rack Slice Airflow (cfm) | 1440 | 1440 | 1440 | 1440 |

Next in the process, the total rack airflow for each rack pair (referred to herein as "rack slice") is calculated. This total is shown in Table 2. In the example, the airflow at each rack slice is 1440 cfm with total row airflow for each row equal to 2880 cfm, making a uniform distribution of heating airflow in the cluster layout. The example described above is somewhat of an ideal situation, and in other examples, the airflows may not be equal, but the process works towards balancing the airflows across each slice and for each row.

More coolers may be needed in the cluster to capture the rack exhaust air if large rack airflow is located at the row ends. Therefore, in one embodiment for cases when a rack at a row end has a larger airflow than that of a rack adjacent to it in the same row; the position of these two racks is interchanged.

Table 3 shows the racks of Table 2 rearranged to move high airflow racks from the ends of the cluster. In Table 3, the position of the rack with 800 cfm airflow is switched with that of the rack with 320 cfm at the right side of Row A and the position of the rack with 960 cfm airflow is switched with that of the rack having 160 cfm airflow at the left side of Row B.

TABLE 3

Rearrangement of Racks in Table 2

| RowA (airflow cfm) | 480 | 1280 | 800 | 320 |
| --- | --- | --- | --- | --- |
| RowB (airflow, cfm) | 160 | 960 | 1120 | 640 |

After positioning the racks in the cluster, in one embodiment, the process performed by the tool determines the number and placement of coolers in the cluster. The number of coolers needed can be determined based on the total rack airflow and the target air ratio, and the number of coolers needed is directly related to the desired cooling redundancy. A large value of target air ratio corresponds to high cooling redundancy and vice versa. For example, a larger value of target air ratio would be used to achieve an "n+2" cooling redundancy than would be required to achieve "n+1". The number of coolers required in a cluster is calculated using Equation 1 below:

$$\text{No. of coolers} = (\text{Total Rack Airflow}) * (AR_{Target}) / (\text{Single cooler airflow}) \quad (1)$$

In Equation 1, since, the number of coolers cannot be a fraction; the result is rounded up to the next integer. Applying Equation (1) to the example discussed above with reference to Table 3, using coolers having 2900 cfm, and an $AR_{Target}$ value of 1.2, results in a value of 2.38, rounded up to 3 coolers. The $AR_{Target}$ is the target air ratio. The air ratio is defined as the ratio of total cooling airflow to total rack airflow. The AR should be greater than 1 and in one embodiment, the value of $AR_{Target}$ is 1.2. The three coolers are divided between Rows A and B based on the total rack airflow of the rows. In the example of Table 3, the total airflow of the racks of Row A and that of Row B are equal, two coolers are arbitrarily assigned to Row A, and one cooler is assigned to Row B. If the rows were not of equal length, then the coolers could be placed to make the rows of more equal length.

Next, the location of the cooler in the rows must be determined. In one embodiment, since the coolers have less ability to capture exhaust air from the racks if they are located at the ends of the cluster, the ends are not considered as a possible location for the coolers, and accordingly, the coolers are placed between racks. For the example of Table 3, there are three possible cooler locations in each row between racks. These locations are generally referred to as cooler slices herein, and in general for a number r of rack pairs or slices in a cluster, there are r−1 cooler slices. Also, more than one cooler may be included at each cooler slice. Table 4 shows the total combined airflow for each rack slice for the example of Table 3, three possible cooler locations j1, j2 and j3, and four rack slices i1, i2, i3 and i4.

TABLE 4

Rack Slice Airflow and Possible Cooler Locations

| Combined Airflow | 640 | Cooler(s) | 2240 | Cooler(s) | 1920 | Cooler(s) | 960 |
|---|---|---|---|---|---|---|---|
| | i1 | j1 | i2 | j2 | i3 | j3 | i4 |

The cooler(s) at each cooler slice location have a potential to capture hot exhaust air from each rack slice location. This potential decreases with the increase in distance between the cooler slice location and the rack slice location and it increases with the increase in magnitude of rack slice airflow or cooler slice airflow. The total airflow that can be captured from a rack slice by coolers from all cooler slices can be determined using Equation 2.

for i=1, 2, r (number of rack slices)

$$S_i^* = \sum_{j=1}^{r-1} A_{ij} n_j^c \quad \text{Equation (2)}$$

where,
for j=1, 2, (r−1) or number of cooler slices $$A_{ij} = \frac{y_i Q_j^c}{\sum_{i=1}^{r} y_i}, \quad y_i = \begin{cases} s_i, & \text{for } (i-j) = 0 \text{ or } 1 \\ \frac{S_i}{p^{(j-i)}}, & \text{for } (i-j) < 0 \\ \frac{S_i}{p^{(i-j-1)}}, & \text{for } (i-j) > 1 \end{cases} \quad \text{Equation (3)}$$

where,
AR is the Air Ratio, defined as the ratio of total cooling airflow and the total rack airflow.
$S_i$ is the rack slice airflow at $i^{th}$ rack slice location.
$S_i^*$ is the amount of airflow that can be captured from $i^{th}$ rack slice by coolers at all cooler slices.
p is a constant (e.g. 2, 10 etc.). A large value for this constant implies a drastic decrease in a cooler's capturing effect with increasing distance between cooler and rack slices. The value of p=10 is observed to be a reasonable choice for practical cases and is used in at least some embodiments of the invention.
$n_j^c$ is the number of coolers at $j^{th}$ cooler slice location.
$Q_j^c$ is the airflow rate of a cooler (e.g. 2900 cfm for IRRC or "c" type coolers) at $j^{th}$ cooler slice.
$A_{ij}$ can be considered a "capture coefficient" as it relates the number of coolers at any cooler slice to the amount of rack airflow that can be captured at any rack slice.

In at least one embodiment, the tool provides a layout that distributes the rack airflow and cooling airflow substantially evenly in the cluster layout. With rack slice airflows evenly placed, the next step is to position the coolers. This can be achieved by placing coolers such that the product of Air Ratio (AR) and rack slice airflow matches the airflow that can be captured by coolers from a rack slice (calculated using Equation (2)). Mathematically, it is a minimization problem with the following cost function:

$$\sum_{i=1}^{r} (AR \times S_i - S_i^*)^2$$

With the constraints $$\sum_{j=1}^{r-1} n_j^c = \text{No. of coolers and } 0 \leq n_j^c \leq \text{No. of coolers}$$

This problem is solved in some embodiments using standard optimization algorithms (e.g. by branch and bound method etc.). In another embodiment, a simple approach that is fast and computationally inexpensive is used to solve the minimization problem. This approach will now be described with reference to FIG. 4 which shows a flow chart for a process 500 for determining the number of coolers at all cooler slices. In a first stage 502 of the process 500, a determination is made as to whether there is only one cooler. If there is only one cooler, then at stage 504, the cooler is placed at a center cooler slice location, and at stage 542, the process 500 ends.

Figure 4:
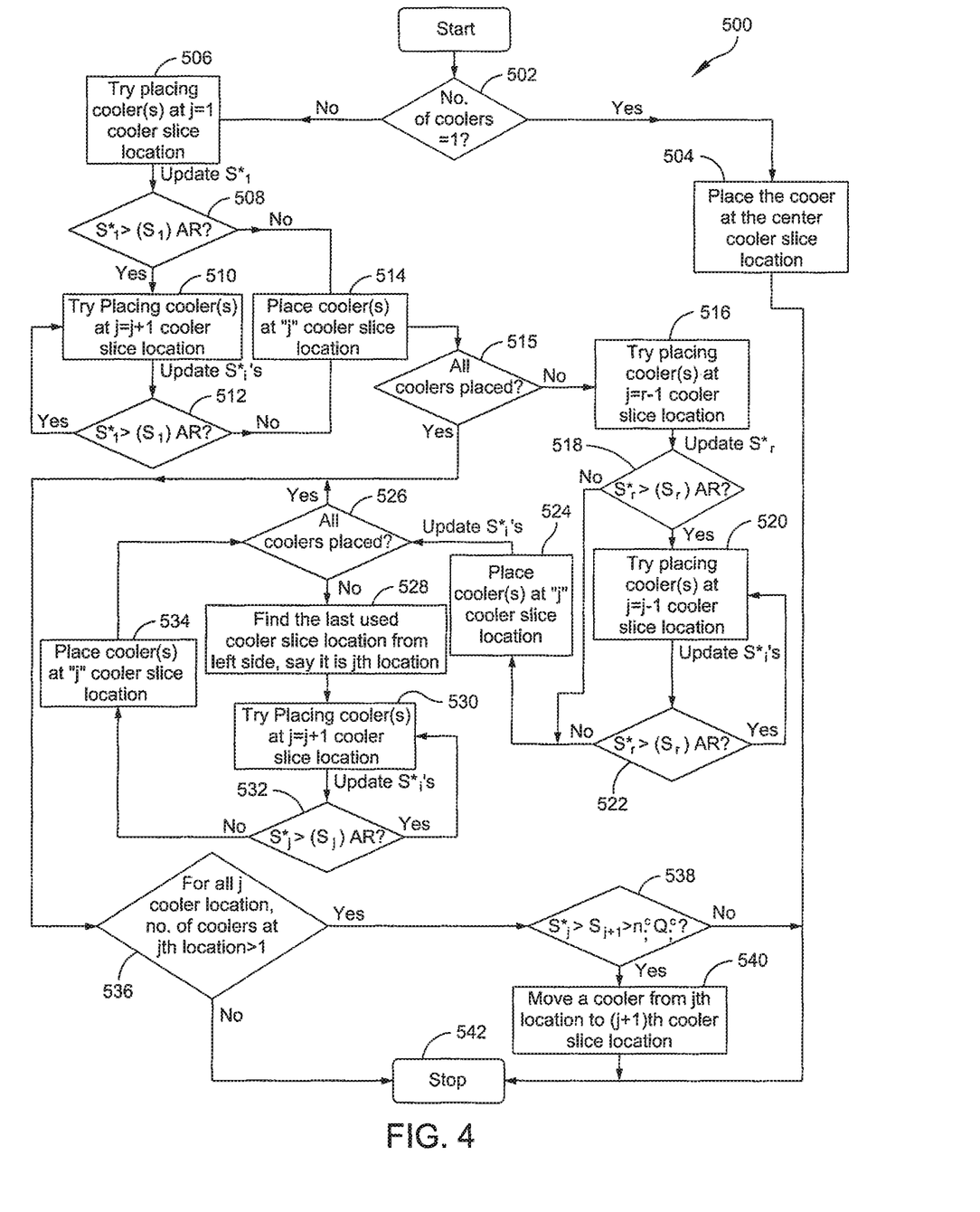
FIG. 4 shows a process for determining a layout of equipment in a data center in accordance with one embodiment.

If there is more than one cooler at stage 502, then process 500 proceeds to stage 506 where a cooler is placed at the first slice location j=1. At 508, a determination is then made as to whether the amount of airflow that can be captured from the $1^{st}$ rack slice by all of the placed coolers (only one cooler at this point in the process) is greater than the product of the airflow from the first rack slice and the air ratio AR. If the outcome of determination block 508 is YES, then the optimum position of the first cooler may not be at j=1, and at block 510, the first cooler is moved to the next cooler slice location and at 512, a determination is again made as to whether the amount of airflow that can be captured from the $1^{st}$ rack slice by all of the placed coolers (only one cooler at this point in the process) is greater than the product of the airflow from the first rack slice and the air ratio AR. Stages 510 and 512 are repeated until the outcome of stage 512 is NO, and then at stage 514 the first cooler is placed at the current j slice. Also, if the outcome of stage 508 is NO, then the process proceeds to stage 514. At stage 515, a determination is made as to whether all coolers have been placed. If the outcome of stage 515 is YES, then the process proceeds to stage 536 and continues as described further below.

If the outcome of stage 515 is NO, then the process 500 proceeds to stage 516, where the second cooler is placed at the last cooler slice location on the right at location j=r−1 (where r is equal to the total number of rack slices). At stage 518 a determination is then made as to whether the amount of airflow that can be captured from the r rack slice by all of the placed coolers is greater than the product of the airflow from the r rack slice and the air ratio AR. If the outcome of determination block 518 is YES, then the optimum position of the second cooler may not be at j=r−1, and at block 520, the second cooler is moved to the next cooler slice location to the left (j=j−1) and at stage 522, a determination is again made as to whether the amount of airflow that can be captured from the r rack slice by all of the placed coolers is greater than the product of the airflow from the r rack slice and the air ratio AR. Stages 520 and 522 are repeated until the outcome of stage 522 is NO, and then at stage 524 the second cooler is placed at the current j slice. Also, if the outcome of stage 518 is NO, the process proceeds to stage 524.

The process 500 then proceeds to stage 526 where a determination is made as to whether all coolers have been placed. If the outcome of stage 526 is NO, then the process moves to stages 528 and 530 where the next cooler is placed at a cooler slice location which is adjacent to the last used cooler slice location from the left side. At stage 532 a determination is then made as to whether the amount of airflow that can be captured from the j rack slice by all of the placed coolers is greater than the product of the airflow from the j rack slice and the air ratio AR. If the outcome of determination block 532 is YES, then the optimum position of the current cooler may not be at the current location, and at block 530, the current cooler is moved to the next cooler slice location to the right (j=j+1). Stages 530 and 532 are repeated until the outcome of stage 532 is NO, and then at stage 534 the second cooler is placed at the current j slice. Stages 526 to 532 are repeated until all coolers have been placed.

Once all coolers have been placed, then the process 500 proceeds to stage 536 where it is determined whether more than one cooler exists at each cooler slice. If the outcome of stage 536 is YES, then the process moves to stage 538, where a determination is made as to whether the rack airflows adjacent each cooler slice is greater than the combined airflow of multiple coolers at the cooler slice. This step helps to distribute the cooling airflow more evenly throughout the cluster by moving cooler(s) towards the middle of the cluster. If the outcome of stage 538 is YES, then at stage 540 one of the coolers is moved to the next cooler location to the left, unless the current slice is the last slice. If the outcome of stage 538 or 536 is NO, or after stage 540, then the process ends at stage 542.

Table 5 shows the distribution of coolers between rack slices.

TABLE 5

Shows the Distribution of Coolers in Between Rack Slices

| Rack slice airflow (cfm) or "IRRC" coolers | 640 | 1 IRRC | 2240 | 1 IRRC | 1920 | 1 IRRC | 960 |
|---|---|---|---|---|---|---|---|

Figure 5:
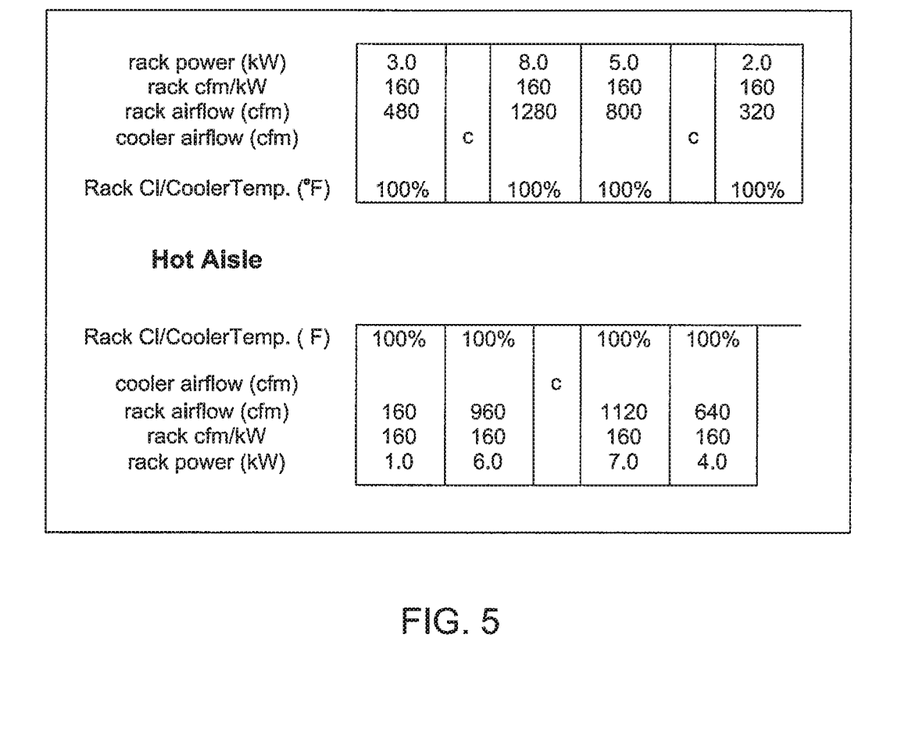
FIG. 5 shows a preferred layout of a cluster of equipment determined using a tool in accordance with one embodiment.

Once the number of coolers required at all cooler slices is determined, the last step is to place the racks and coolers in a cluster layout. The cooler(s) required at different cooler slices are divided between Row A and Row B such that both rows are as close as possible to equal length. FIG. 5 shows the final layout for the example considered here. As can be seen, the racks and coolers are evenly distributed with all racks having 100% capture index. Once the layout is determined, it can be displayed and the racks and coolers may be installed in the data center in accordance with the layout.

In embodiments described above, tools are described for evaluating data centers that contain CRACs and equipment racks. As readily understood by one of ordinary skill in the art, in other embodiments, processes and systems may be used with cooling providers other than CRACs and with cooling consumers other than equipment racks.

In embodiments described herein, cluster layouts of coolers and equipment racks meeting cooling criteria are determined and presented to a user. In other embodiments, the layout determined may be used as an input into an optimization algorithm to provide further optimization of the cooling performance of the cluster. The optimization algorithms used may be based on, for example, genetic algorithms or branch and bound methods. Within the optimization algorithm, the cooling performance of each candidate layout may be determined from computational fluid dynamics, or real-time algorithms based on CVA, Superposition, Neural Networks, algebraic, PDA-CFD, etc. models. Embodiments of the invention are useful with these more complex techniques as they can greatly reduce the time to perform an optimization, since the input to the algorithms are solutions that meet the cooling criteria.

In certain examples discussed herein, solutions provided by tools may provide layouts described as optimized layouts or near-optimized layouts. While complete optimized layouts are not guaranteed, solutions provided by such tools are generated quickly and satisfy specified criteria.

In embodiments of the invention, a specified cooling redundancy may be used as part of the cooling criteria, and the cluster layout may be designed to meet the cooling redundancy.

As readily understood by one of ordinary skill in the art given the benefit of this disclosure, tools described herein may be used for cold aisle applications and for application that use raised floors with perforated tiles acting as the cooling providers. The perforated tiles may be the sole cooling providers in the application or may be used in conjunction with in-row coolers. Further, the tools may be used with a variety of rack widths, including a cold aisle having a six foot aisle covered with three rows of perforated tiles.

In at least some embodiments of the invention discussed herein, the performance of assessments and calculations in real-time refers to processes that are completed in a matter of a few seconds or less rather than several minutes or longer as can happen with complex calculations, such as those involving typical computational fluid dynamics calculations.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for providing a layout of equipment in a data center, the equipment including a plurality of equipment racks, and at least one cooling provider, the method comprising:
   receiving data regarding airflow consumption for each of the plurality of equipment racks and cooling capacity of the at least one cooling provider;
   determining a layout of the data center; and
   displaying the layout of the data center, wherein determining the layout includes:
      pairing each equipment rack of the plurality of equipment racks with another equipment rack of the plurality of equipment racks based on airflow consumption of each of the plurality of equipment racks to create a plurality of pairs of equipment racks such that a greatest airflow consuming equipment rack is paired with a least airflow consuming equipment rack, and a second greatest airflow consuming equipment rack is paired with a second least airflow consuming rack; and arranging the plurality of pairs of equipment racks to form a two-row cluster of equipment racks based on the airflow consumption of each of the plurality of equipment racks, wherein each pair of the plurality of pairs of equipment racks includes an equipment rack in a first row of the cluster and an equipment rack in a second row of the cluster.

2. The method of claim 1, wherein arranging the plurality of pairs of equipment racks includes:

positioning the greatest airflow consuming equipment rack in the first row of the cluster and the least airflow consuming equipment rack across from the greatest airflow consuming equipment rack in the second row of the cluster;

positioning the second greatest airflow consuming equipment rack in the second row of the cluster adjacent to the least airflow consuming equipment rack;

positioning the second least airflow consuming rack in the first row adjacent to the greatest airflow consuming equipment rack and across from the second greatest consuming equipment rack; and positioning additional pairs of equipment racks of the plurality of pairs of equipment racks such that a smaller airflow consuming equipment rack of a pair of equipment racks is positioned adjacent a larger airflow consuming equipment rack of another pair of equipment racks.

3. The method of claim 2, wherein arranging the plurality of pairs of equipment racks further includes:

identifying an equipment rack positioned at a row end having a larger airflow than an adjacent equipment rack; and responsive to the identification, interchanging the position of the identified equipment rack with the adjacent equipment rack such that the adjacent equipment rack is positioned at the row end.

4. The method of claim 3, further comprising:

determining a total airflow consumption value for the equipment racks; and determining a number of cooling providers to be placed in the cluster based on the total airflow consumption value and a desired air ratio of total cooling airflow to total equipment rack airflow.

5. The method of claim 4, further comprising determining a location of each cooling provider of the number of cooling providers within the first row and the second row and between adjacent equipment racks such that cooling airflow provided by each cooling provider is distributed evenly.

6. The method of claim 5, further comprising:

determining a calculated air ratio value;

determining a total airflow consumption value for each pair of equipment racks positioned across from one another; and determining an amount of airflow that is captured by at least one cooling provider from each pair of equipment racks positioned across from one another, wherein a cooling provider is positioned such that a product of the calculated air ratio value and the combined airflow consumption value for each pair of equipment racks matches the amount of airflow that is captured by the at least one cooling provider.

7. The method of claim 1, further comprising:

receiving information related to a desired cooling redundancy for at least one of the equipment racks;

determining a number of cooling providers to be placed in the cluster based on the desired cooling redundancy; and determining a location of each cooling provider of the number of cooling providers such that each cooling provider is positioned adjacent two equipment racks.

8. The method of claim 1, wherein arranging the plurality of pairs of equipment racks includes:

identifying a rack pair having a greatest airflow consumption value, a rack pair having a least airflow consumption value, and a rack pair having a second least airflow consumption value; and positioning the rack pair having the greatest airflow consumption value in a middle position of the cluster, arranging the rack pair having the least airflow consumption value at a first end of the cluster, and arranging the rack pair having the second least airflow consumption value at a second end of the cluster.

9. The method of claim 1, further comprising:

determining a first combined airflow consumption value for each pair of the plurality of pairs of equipment racks; and determining a second combined airflow consumption value for the equipment racks in each row of the two-row cluster of equipment racks.

10. The method of claim 9, wherein pairing further comprises pairing the plurality of equipment racks in the two-row cluster of equipment racks such that the first combined airflow consumption value for each of the pairs of the plurality of pairs of equipment racks is uniformly distributed for each pair of the plurality of pairs of equipment racks and the second combined airflow consumption value for the equipment racks in each row is uniformly distributed across each row.

11. A system for providing a layout of equipment in a data center, the equipment including a plurality of equipment racks, and at least one cooling provider, the system comprising:

a display;

a storage device;

an interface; and a controller coupled to the display, the storage device, and the interface and configured to:

receive through the interface data regarding airflow consumption for each of the plurality of equipment racks and cooling capacity of the at least one cooling provider;

determine a layout of the data center; and display the layout of the data center on the display, wherein determine the layout includes:

pairing each equipment rack of the plurality of equipment racks with another equipment rack of the plurality of equipment racks based on airflow consumption of each of the plurality of equipment racks to create a plurality of pairs of equipment racks such that a greatest airflow consuming equipment rack is paired with a least airflow consuming equipment rack, and a second greatest airflow consuming equipment rack is paired with a second least airflow consuming rack; and arranging the plurality of pairs of equipment racks to form a two-row cluster of equipment racks based on the airflow consumption of each of the plurality of equipment racks, wherein each pair of the plurality of pairs of equipment racks includes an equipment rack in a first row of the cluster and an equipment rack in a second row of the cluster.

12. The system of claim 11, wherein arranging the plurality of pairs of equipment racks includes:
- positioning the greatest airflow consuming equipment rack in the first row of the cluster and the least airflow consuming equipment rack across from the greatest airflow consuming equipment rack in the second row of the cluster;
- positioning the second greatest airflow consuming equipment rack in the second row of the cluster adjacent to the least airflow consuming equipment rack;
- positioning the second least airflow consuming rack in the first row adjacent to the greatest airflow consuming equipment rack and across from the second greatest consuming equipment rack; and
- positioning additional pairs of equipment racks of the plurality of pairs of equipment racks such that a smaller airflow consuming equipment rack of a pair of equipment racks is positioned adjacent a larger airflow consuming equipment rack of another pair of equipment racks.

13. The system of claim 12, wherein arranging the plurality of pairs of equipment racks further includes:
- identifying an equipment rack positioned at a row end having a larger airflow than an adjacent equipment rack; and
- responsive to the identification, interchanging the position of the identified equipment rack with the adjacent equipment rack such that the adjacent equipment rack is positioned at the row end.

14. The system of claim 13, wherein the controller is further configured to:
- determine a total airflow consumption value for the equipment racks; and
- determine a number of cooling providers to be placed in the cluster based on the total airflow consumption value and a desired air ratio of total cooling airflow to total equipment rack airflow.

15. The system of claim 14, wherein the controller is further configured to determine a location of each cooling provider of the number of cooling providers within the first row and the second row and between adjacent equipment racks such that cooling airflow provided by each cooling provider is distributed evenly.

16. The system of claim 15, wherein the controller is further configured to:
- determine a calculated air ratio value;
- determine a total airflow consumption value for each pair of equipment racks positioned across from one another; and
- determine an amount of airflow that is captured by at least one cooling provider from each pair of equipment racks positioned across from one another,
- wherein a cooling provider is positioned such that a product of the calculated air ratio value and the combined airflow consumption value for each pair of equipment racks matches the amount of airflow that is captured by the at least one cooling provider.

17. The system of claim 11, wherein the controller is further configured to:
- receive information related to a desired cooling redundancy for at least one of the equipment racks;
- determine a number of cooling providers to be placed in the cluster based on the desired cooling redundancy; and
- determine a location of each cooling provider of the number of cooling providers such that each cooling provider is positioned adjacent two equipment racks.

18. The system of claim 11, wherein arranging the plurality of pairs of equipment racks includes:
- identifying a rack pair having a greatest airflow consumption value, a rack pair having a least airflow consumption value, and a rack pair having a second least airflow consumption value; and
- positioning the rack pair having the greatest airflow consumption value in a middle position of the cluster, arranging the rack pair having the least airflow consumption value at a first end of the cluster, and arranging the rack pair having the second least airflow consumption value at a second end of the cluster.

19. The system of claim 11, wherein the controller is further configured to:
- determine a first combined airflow consumption value for each pair of the plurality of pairs of equipment racks; and
- determine a second combined airflow consumption value for the equipment racks in each row of the two-row cluster of equipment racks,
- wherein pairing further comprises pairing the plurality of equipment racks in the two-row cluster of equipment racks such that the first combined airflow consumption value for each of the pairs of the plurality of pairs of equipment racks is uniformly distributed for each pair and the second combined airflow consumption value for the equipment racks in each row is uniformly distributed across each row.

20. A non-transitory computer readable medium having stored thereon sequences of instruction including instructions that will cause a processor to:
- receive data regarding airflow consumption for each of a plurality of equipment racks and cooling capacity of at least one cooling provider contained in a data center;
- determine a layout of the data center; and
- display the layout of the data center on a display, wherein determine the layout includes:
  - pairing each equipment rack of the plurality of equipment racks with another equipment rack of the plurality of equipment racks based on airflow consumption of each of the plurality of equipment racks to create a plurality of pairs of equipment racks such that a greatest airflow consuming equipment rack is paired with a least airflow consuming equipment rack, and a second greatest airflow consuming equipment rack is paired with a second least airflow consuming rack; and
  - arranging the plurality of pairs of equipment racks to form a two-row cluster of equipment racks based on the airflow consumption of each of the plurality of equipment racks, wherein each pair of the plurality of pairs of equipment racks includes an equipment rack in a first row of the cluster and an equipment rack in a second row of the cluster.

* * * * *